United States Patent [19]

Öllinger

[11] 4,160,874
[45] Jul. 10, 1979

[54] PROCESS FOR SIGNALING AN INTERRUPTION IN THE STATE OF READINESS FOR THE RECEPTION IN DATA TERMINAL DEVICES IN WHICH DATA ARE EXCHANGED

[75] Inventor: Max Öllinger, Munich, Fed. Rep. of Germany

[73] Assignee: Siemens Aktiengesellschaft, Berlin & Munich, Fed. Rep. of Germany

[21] Appl. No.: 816,455

[22] Filed: Jul. 18, 1977

[30] Foreign Application Priority Data

Aug. 30, 1976 [DE] Fed. Rep. of Germany ....... 2639063

[51] Int. Cl.$^2$ ..................... H04N 1/32; H04L 25/02
[52] U.S. Cl. ........................... 178/69 G; 178/2 R; 178/4.1 R
[58] Field of Search ............. 178/3, 2 R, 4.1 R, 4.1 B, 178/2 C, 42, 69 G, 1, 2 E, 4.1 C; 340/313, 152 R; 358/257

[56] References Cited

U.S. PATENT DOCUMENTS

| | | | |
|---|---|---|---|
| 2,669,602 | 2/1954 | Salmon et al. | 178/42 |
| 2,921,116 | 1/1960 | Makary | 178/2 R |
| 3,310,627 | 3/1967 | Da Silva | 178/1 |
| 3,444,315 | 5/1969 | Shimabukuro et al. | 358/257 |
| 3,830,962 | 8/1974 | Mailloux | 358/257 |

FOREIGN PATENT DOCUMENTS 761873 11/1956 United Kingdom.

*Primary Examiner*—Thomas A. Robinson
*Attorney, Agent, or Firm*—Hill, Van Santen, Steadman, Chiara & Simpson

[57] ABSTRACT

In a process for signaling an interruption in the state of readiness of a data terminal device in a called station, the data being transmitted over a data selector network, and in particular for teleprinters, following the establishment of a connection, the calling station requests the called station to transmit identification by way of the data selector network. Following reception of the identification assigned to the called station, the data transmission begins and upon the occurrence of disturbances which interrupt the state of readiness for reception in the called station, a monitoring circuit responds. For the duration of the interruption of the state of readiness the monitoring circuit blocks the identification keyer in the called station from transmitting the identification assigned to the called station and the monitoring circuit automatically clears the connection. The monitoring circuit causes the identification keyer to transmit a specific code character to the calling station, the stipulated code character indicating the disturbance in the state of readiness and possibly the nature of the disturbance, and the monitoring circuit subsequently automatically clears the connection.

7 Claims, No Drawings

PROCESS FOR SIGNALING AN INTERRUPTION IN THE STATE OF READINESS FOR THE RECEPTION IN DATA TERMINAL DEVICES IN WHICH DATA ARE EXCHANGED

BACKGROUND OF THE INVENTION

1. Field of the Invention

The present invention relates to a process for signaling an interruption in the state of readiness for reception of a data terminal in a called station, in data transmission over a data selector network, in particular for teleprinters, wherein following the establishment of the connection the calling station requests, via the data selector network, the called station to transmit its identification, and following the reception of the identification assigned to the called station, the data transmission begins.

2. Description of the Prior Art

In data transmission employing teleprinters which transmit and receive data by way of the Telex network in accordance with the start-stop principle, the start-stop teleprinters are constantly in a state or readiness for reception. Following the establishment of the connection by the calling station, the assigned identifications are exchanged between the two stations, and the same are printed out on the respective teleprinter. The continuous state of readiness for receiving data ensures that the transmitted item of data is actually printed out or recorded in the data terminal device of the called station, it being immaterial whether the receiving teleprinter is attended or unattended.

However, the state of continuous readiness for reception of a start-stop teleprinter can become disturbed or impaired when, for example, the paper in the page printer or the punched tape comes to an end, when the ribbon is exchanged, or the paper is being inserted into the page printer, and therefore the housing is removed and the housing cover opened. Although the calling, transmitting station and the called station have successfully effected the connection, and the identification exchange, in the event of a disturbance in the state of readiness for reception, the item of data is lost, either partially or entirely.

It is already well known in start-stop teleprinters to provide a monitoring circuit, for example in the form of sensing contacts, which serves to monitor the end of the paper in the printer or the punched tape feed unit, and the opening and closing of the housing cover. When the monitoring device responds, the connection is cleared. This results in an interruption in the teleprinter transmission. In this case, the calling station is not aware, however, of the discontinuation of the state of readiness for operation.

A process is already known for signaling an interruption in the state of readiness in the reception in electronic teleprinters, wherein following the response of the data carrier end contact, an existing Telex connection is cleared in the printer of the teleprinter. In a situation in which a call is incoming, and the data carrier simultaneously comes to an end, and the housing cover is open, the remote switching device signals to the subscriber connection line the state of "subscriber disturbed" for a teleprinter single terminal, for example by continuous Z-polarity, and the state "subscriber engaged" in the case of the teleprinter collective terminal, for example by a continuous A-polarity. However, the last-mentioned known signaling technique frequently does not exist in the Telex network or in other data networks, since the devices, for example switching systems, do not permit these procedures, or because the requisite switching devices are simply not available.

SUMMARY OF THE INVENTION

The primary object of the present invention is to provide a process for signaling an interruption in the state of readiness for reception of the data terminal device in a called station, which is independent of the switching devices and conditions of the Telex network or other data network.

This object is achieved, according to the present invention, in that on the occurrence of disturbances which interrupt the state of readiness for reception of the data terminal device in a called station, a monitoring circuit responds, so that for the duration of the interruption in readiness the monitoring circuit blocks the identification keyer in the called station from transmitting the identification assigned to the called station, and that the monitoring circuit automatically clears the connection.

A process carried out according to the present invention has the advantage that the calling station recognizes the disturbance in the state of readiness for operation in the data terminal device of the called station, and does not transmit any data. The signaling of the state of readiness for reception is effected directly from subscriber to subscriber, without taking into account the properties of the data network and of any switching devices which may be provided. The connection is cleared automatically. It is not possible to transmit the identification of the called station, and therefore the data transmission is not begun. It is advantageous to transmit a special code character in place of the identification, by which means the calling station is informed of the disturbance in the state of readiness for reception. By means of the transmission of a plurality of the characters, the number which corresponds at the maximum to the identification characters, the origin of the disturbance, e.g. the end of the paper or the fact that the housing cover is open, can be communicated to the calling station and optically displayed or acoustically signaled. The calling station can then decide, depending upon the origin of the disturbance, when another attempt is to be made to transmit the data to the called station.

The calling station establishes the connection by way of the data network, and requests that the called station transmit its assigned identification, as is well known to those versed in the art. The called station contains a first monitoring circuit, which on the occurrence of disturbances in the data terminal device of the called station, for example the end of the paper or the opening of the housing cover in order to exchange the ribbon, etc, responds and emits a control signal to the identification keyer for the duration of the interruption of the state of readiness for the reception. This signal blocks the transmission of the identification assigned to the called station for the duration of the interruption in the state of readiness for the reception. When the monitoring circuit responds, the data connection is immediately cleared. In a situation in which a call is incoming and the monitoring circuit simultaneously responds, in the event of servicing or maintenance, following the reception of the request signal to transmit identification, the connection is cleared from the called station. However, the connection can also be cleared from the calling station, if following the transmission of the request, the identification assigned to the called station is not received in the calling station within a specific length of time.

Another exemplary embodiment of the invention provides that, in the event of an interruption in the state of readiness for reception, following the request from the calling station to transmit identification, a specific code character is transmitted which informs the calling station that the data terminal device of the called station is not ready to receive. By agreement, a specific code combination is employed and transmitted solely in order to indicate the disturbance in the state of readiness for reception. For example, the code combination No. 16 of the CCITT Code No. 2 employed in the Telex network can be used for this purpose. The transmission of this code combination corresponds to the state "data terminal device in the called station is not ready to receive".

Advantageously, the stipulated code combination is also produced and transmitted by the identification keyer. In this case, the code combination for interruption in the state of readiness for reception is transmitted only when the identification keyer is blocked from transmitting the assigned identification from the monitoring circuit. The stipulated code character is recognized in the calling station and automatically clears the connection from the called station. Advantageously, a plurality of code characters can be transmitted in addition to or in place of the stipulated code character, in order to inform the calling station of the nature of the disturbance in the state of readiness for reception, for example the fact that the data carrier has come to an end or the housing cover is open. This enables the calling station to decide when another transmission attempt is to be undertaken.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a data transmission process in which each subscriber station is connected by way of a line to a telegraphic exchange and in which a calling station can selectively dial and establish a connection to a called station via a telegraphic transmission network, the connection being established between a calling station telegraphic data terminal device and a called station telegraphic data terminal device, in which permanent conditions cannot be transmitted by way of the telegraphic exchanges, and in which the calling station data terminal device requests that the called station data terminal device transmit a station identification code character, and in which data transmission begins after the called station data terminal device transmits and the calling station data terminal device receives the called station identification code characters, the improvement therein comprising the steps of:

monitoring for the presence or absence in the called station of a malfunction or disabling condition to determine the state of readiness of the called station data terminal device to receive data;

blocking the identification code character of the called station data terminal device to prevent transmission of the called station identification code character in response to interruption in the state of readiness to receive data; and then, automatically clearing the established connection between the calling and called stations.

2. The improved process of claim 1, comprising the further step of:

transmitting a specific code character to the calling station in place of the called station identification code character identifying the data receiving status of the called station prior to clearing the connection.

3. The improved process of claim 1, comprising the further step of:

transmitting a code combination to the calling station representing the nature of a disturbance which is causing an interruption in the readiness to receive data, prior to clearing the connection, the code combination including a number of characters.

4. The improved method of claim 3, wherein the maximum number of transmitted code characters is equal to the maximum number of called station identification characters.

5. The improved process of claim 1, comprising the further steps of:

monitoring for the receipt of called station identification code character for a predetermined interval after a request for the same; and in the absence of receipt of the identification code character automatically clearing the connection from the calling station.

6. The improved process of claim 3, comprising the further steps of:

monitoring for the receipt of disturbance code characters at the calling station; and emitting a disturbance signal upon receipt of a disturbance code.

7. The improved process of claim 3, comprising the further steps of:

analyzing the disturbance code to determine the nature of the disturbance; and emitting a disturbance signal representing the nature of the particular disturbance.

* * * * *